(12) United States Patent
Tang

(10) Patent No.: US 7,855,883 B2
(45) Date of Patent: Dec. 21, 2010

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/180,558

(22) Filed: Jul. 27, 2008

(65) Prior Publication Data

US 2009/0268397 A1 Oct. 29, 2009

(30) Foreign Application Priority Data

Apr. 28, 2008 (CN) .................. 2008 1 0301355

(51) Int. Cl.
*H05K 5/00* (2006.01)
*H05K 7/00* (2006.01)
(52) U.S. Cl. .............................. 361/679.55; 361/679.59
(58) Field of Classification Search ............ 361/679.55, 361/679.59
See application file for complete search history.

(56) References Cited

U.S. PATENT DOCUMENTS

| 4,951,241 | A | * | 8/1990 | Hosoi et al. | ............ 361/679.09 |
| 5,469,327 | A | * | 11/1995 | Cheng | ................... 361/679.55 |
| 5,901,035 | A | * | 5/1999 | Foster et al. | ........... 361/679.55 |
| 6,097,592 | A | * | 8/2000 | Seo et al. | ................ 361/679.55 |
| 6,498,719 | B1 | * | 12/2002 | Bridges | ................. 361/679.34 |

FOREIGN PATENT DOCUMENTS

| TW | M246708 | 10/2004 |
| TW | M292106 | 6/2006 |
| TW | M323064 | 12/2007 |

* cited by examiner

*Primary Examiner*—Jayprakash N Gandhi
*Assistant Examiner*—Anthony M Haughton
(74) *Attorney, Agent, or Firm*—Zhigang Ma

(57) ABSTRACT

An exemplary electronic device (30) includes a main body (40) and two supporting mechanisms (60). Each supporting mechanism has a support leg (62). The support leg is rotatably connected to the main body, in order to support the main body. The support leg has a pressing portion (625) exposed from a side of the main body.

18 Claims, 7 Drawing Sheets

ELECTRONIC DEVICE WITH SUPPORT LEGS

BACKGROUND OF THE INVENTION

1. Field of the Invention

The present invention generally relates to electronic devices, and particularly to an electronic device with a main body and a rotatable display body.

2. Discussion of the Related Art

A notebook computer mainly includes a main body with a keyboard and a display body. The display body is rotatably attached to the main body in order that the display body can be opened and closed relative to the main body. In use, the main body is disposed on a flat tabletop of a table, and cannot be adjusted to slant to the flat tabletop. Thereby, the keyboard is not fit a user to operate, and the user easily feel tired after long hours of using the notebook. In addition, when the notebook computer is laid on a table, the main body of the notebook computer is attached to a flat tabletop of the table. Therefore, the heat produced by internal electronic components cannot disperse effectively from the main body of the notebook, even though the notebook has a fan for heat dissipation. As a result, the internal electronic components may be damaged due to overheating. Accordingly, a notebook computer which can solve the above-described problems is needed.

Referring to FIG. 7, a typical notebook computer includes a main body 11 and a display body 12. The main body 11 defines a first groove 113 for receiving a keypad 112. One end of the keypad 112 is rotatably connected to a sidewall of the first groove 113. A bottom wall of the first groove 113 further defines a second groove 115 for receiving an elastic member 114. One end of the elastic member 114 is rotatably connected to a sidewall of the second groove 115. In use, the keypad 112 is rotated through a desired angle relative to the main body 11, and is supported by the elastic member 114. Therefore, the keypad 112 is slanted relative to the main body 11. As a result, the fingers of a user just need to move a short distance to touch the keyboard 112, and the user will feel comfortable. Furthermore, a gap for emitting heat is formed between the keyboard 112 and the main body 11.

However, dust could get into the inside of the main body 11 via the gap between the keyboard and the main body, and accumulate on the internal electronic components therein. Therefore, a short circuit of the internal electronic components may occur, and the heat produced by the internal electronic components is not easily dispersed from inside thereof.

Therefore, an electronic device which overcomes the above-described shortcomings is desired.

SUMMARY

An exemplary electronic device includes a main body and two supporting mechanisms. Each supporting mechanism has a support leg. The support leg is rotatably connected to the main body, in order to support the main body. The support leg has a pressing portion exposed from a side of the main body.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION OF THE EMBODIMENTS

References will now be made to the drawings to describe embodiments of the present electronic device, in detail.

Figure 1:
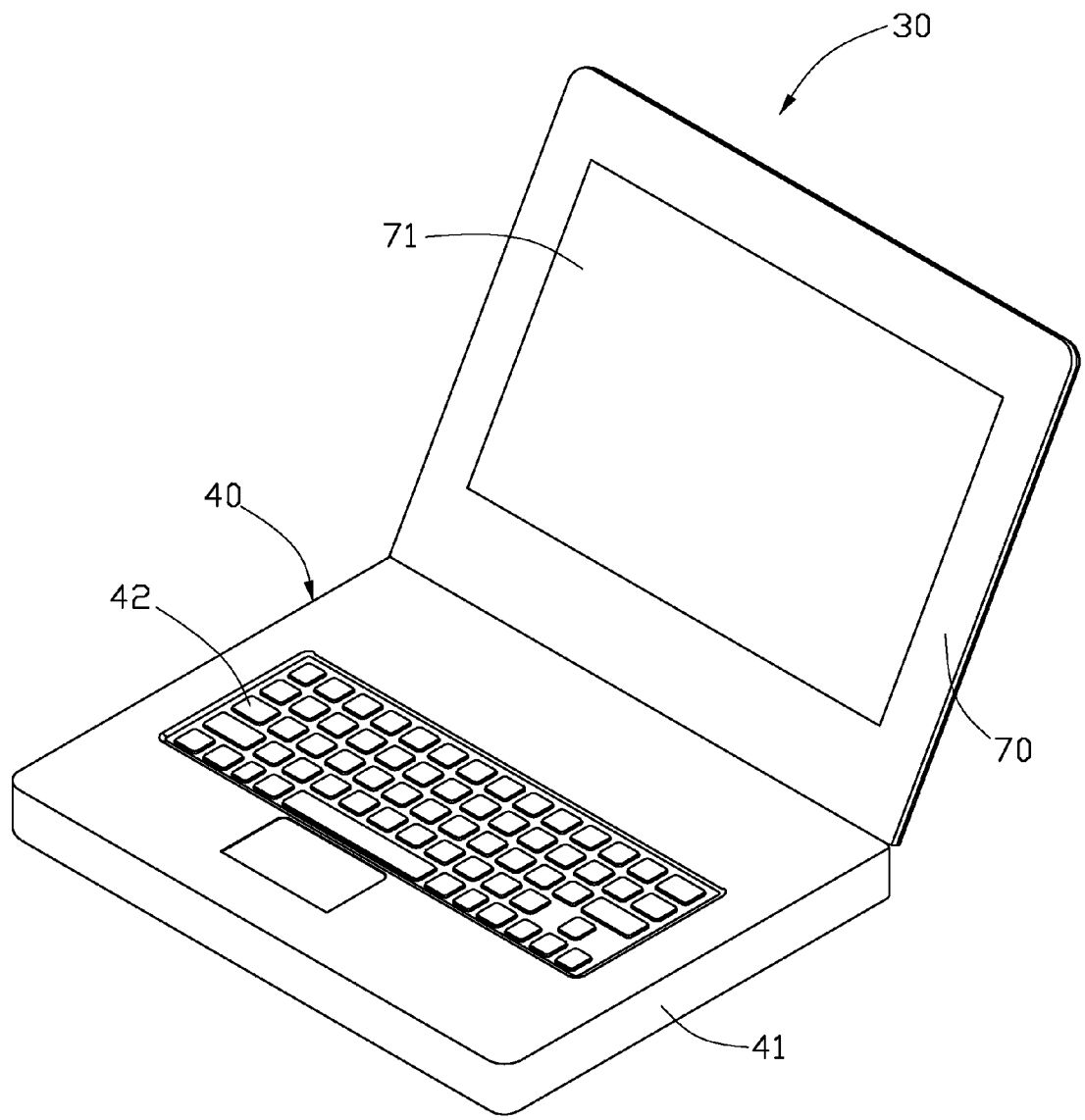
FIG. 1 is an isometric view of a notebook computer in accordance with a first embodiment of the present application.
Figure 2:
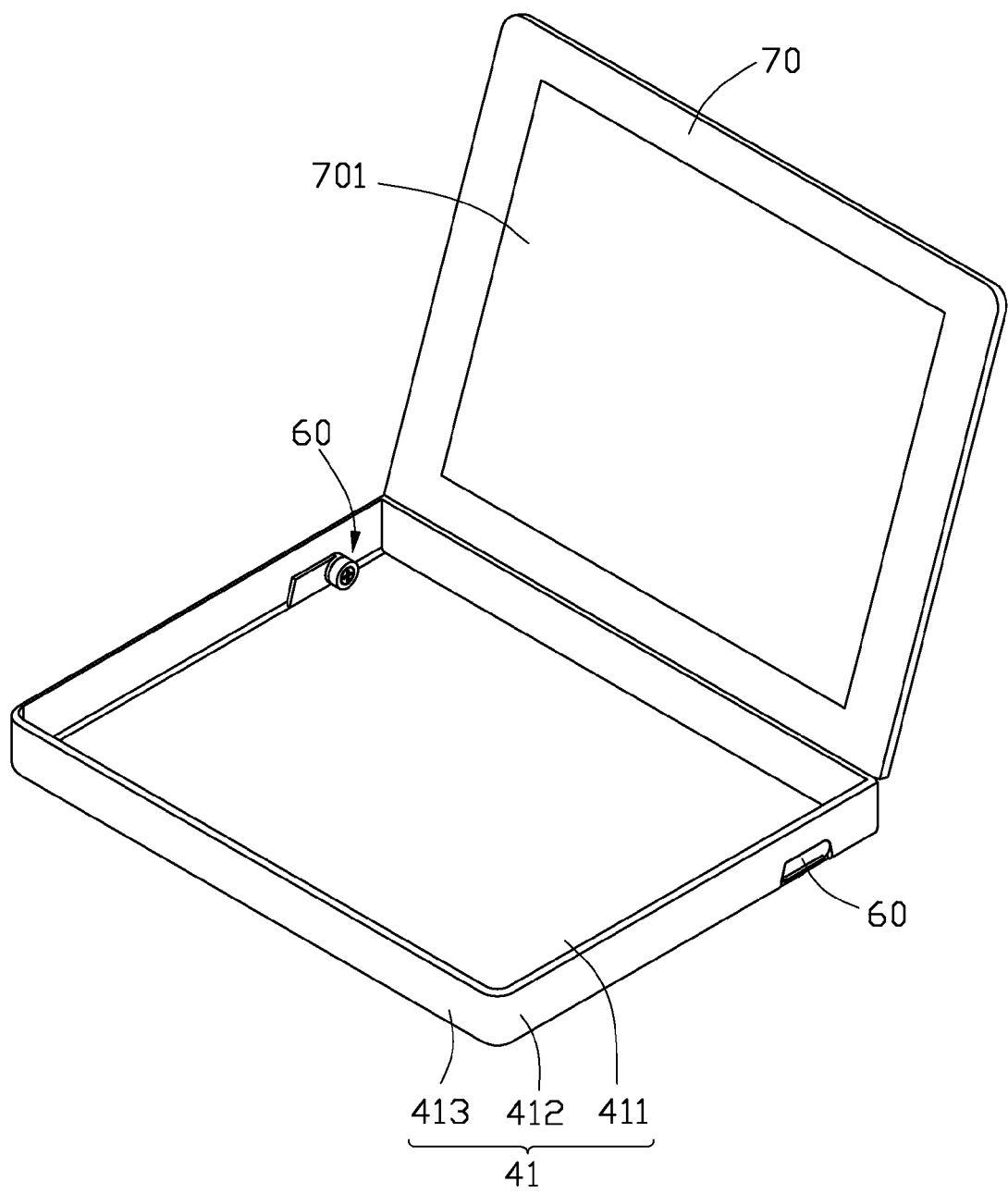
FIG. 2 is an isometric view of the notebook computer of FIG. 1, showing only the bottom housing and the display.

Referring to FIGS. 1 and 2, a notebook computer 30 in accordance with a first embodiment of the present invention is shown. The notebook computer 30 includes a main body 40 and a display body 70 rotatably connected to a side of the main body 40. The main body 40 includes a housing 41, a keyboard 42, two supporting mechanisms 60, and a plurality of electronic components (not shown). The keyboard 42 is assembled on the top of the housing 41. The supporting mechanisms 60 are disposed at opposite sides of the housing 41. The electronic components are disposed in the housing 41 and under the keyboard 42. The display body 70 includes a display panel 71.

Figure 3:
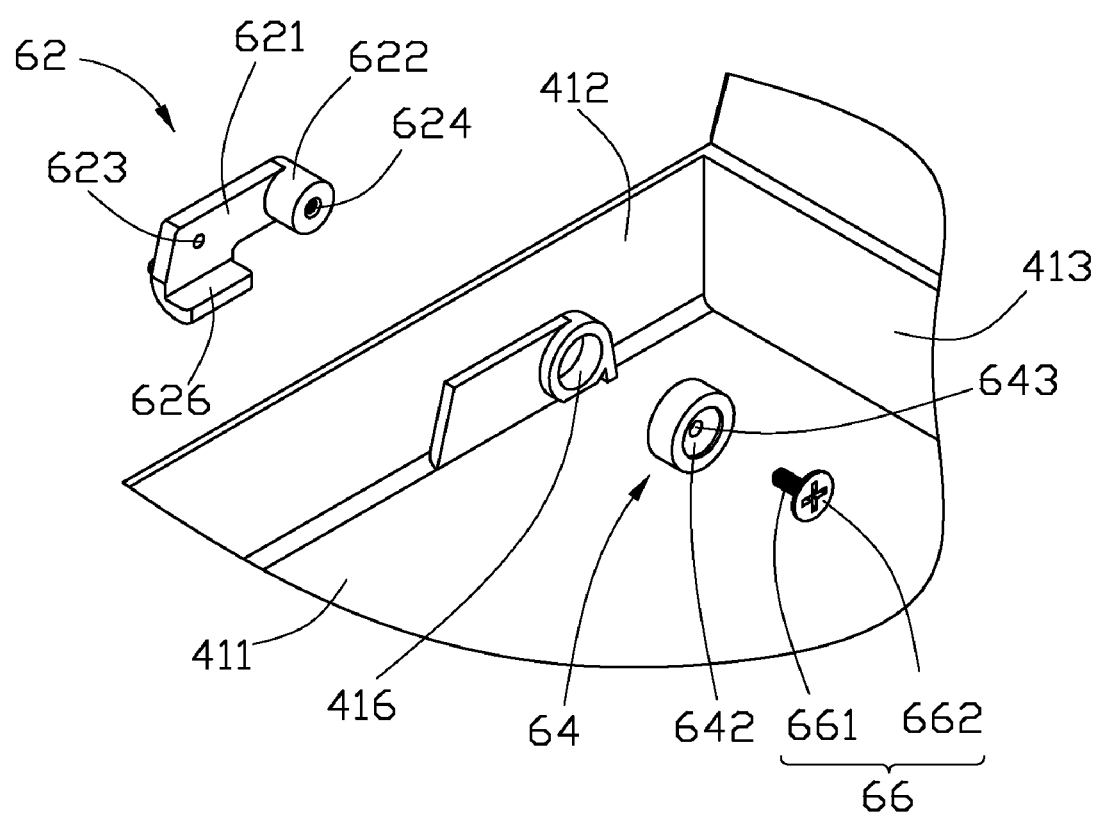
FIG. 3 is a partially exploded, isometric view of the notebook computer of FIG. 2, showing the structure of a support leg.
Figure 4:
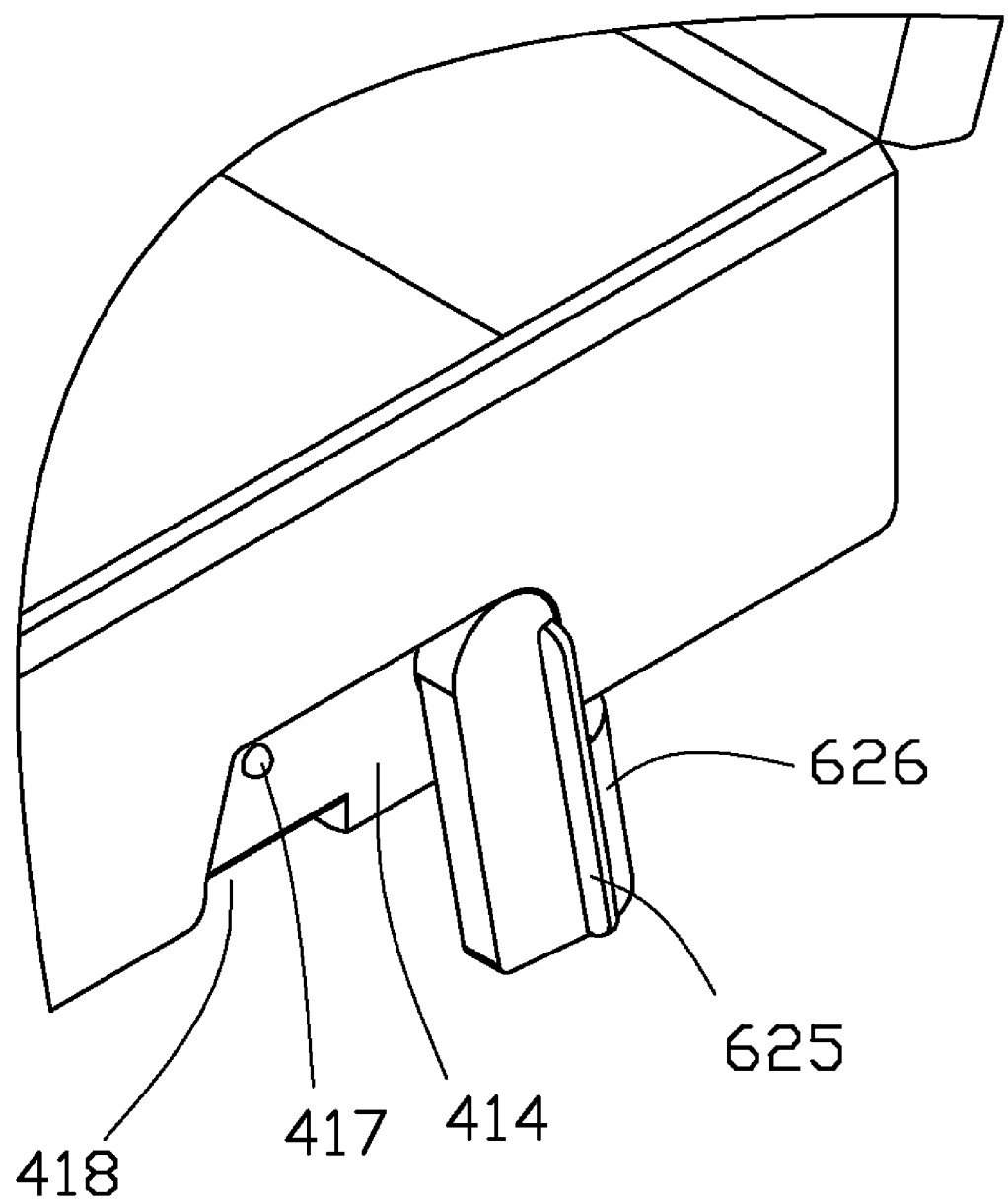
FIG. 4 is a partially isometric view of the notebook computer of FIG. 2, with a support leg in a supporting position to the main body.
Figure 5:
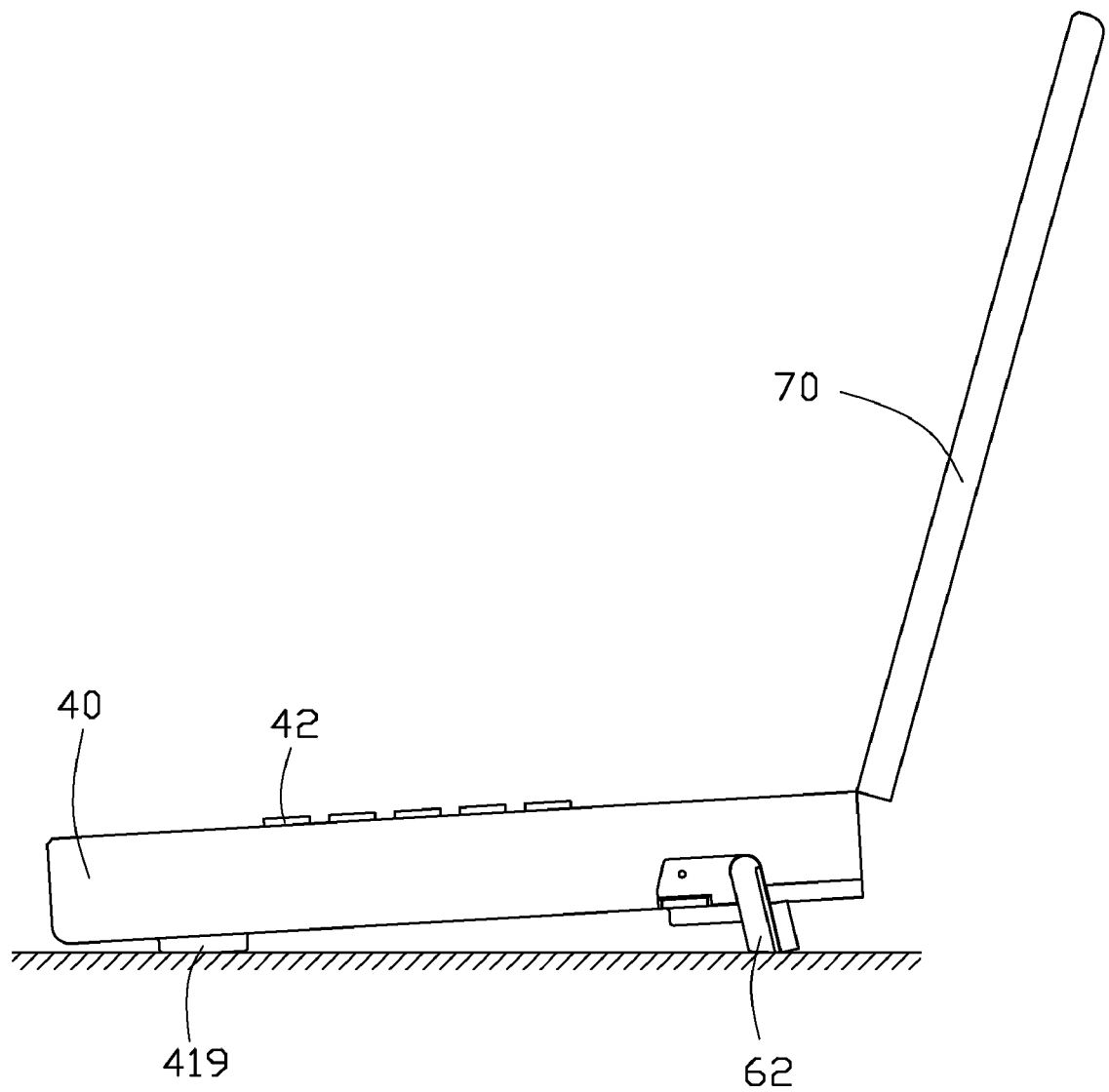
FIG. 5 is a side view of the notebook computer supported by the support legs of FIG. 1, with the support legs in use.

Referring to FIGS. 2 through 4, the housing 41 includes a rectangular base plate 411, two first side plates 412, and two second side plates 413. The first side plates 412 are substantially perpendicularly extended from opposite sides of the base plate 411. The second side plates 413 are substantially perpendicularly extended from the other opposite sides of the base plate 411. Each of the first side plates 412 defines, on the outer surface, a receiving groove 414 at an end adjacent a joint of the housing 41 and the display body 70. One end of the sidewall for defining the receiving groove 414 defines a pivotal hole 416. A semi-spherical limiting protrusion 417 is formed at the other end of the sidewall for defining the receiving groove 414. Each first side plate 412 also defines a cutout 418 at a bottom side of the sidewall for defining the receiving groove 414. Referring to FIG. 5, four pads 419 are respectively formed at the four corners of the base plate 411.

The supporting mechanisms 60 includes a support leg 62, a washer 64, and a fastening member 66. The support leg 62 includes a main portion 621. A shaft portion 622 is formed at one end of the main portion 621. The main portion 621 also defines a semi-spherical limiting groove 623 at the other end opposite to the shaft portion 622 for engaging with the semi-spherical limiting protrusion 417. The shaft portion 622 defines a fixing hole 624 along the axis thereof. A pressing portion 625 is formed on a surface of the main portion 621 away from the shaft portion 622. The pressing portion 625 is a bar in this embodiment. A positioning portion 626 is substantially perpendicularly extended from one side of the main portion 621 along a direction away from the pressing portion 625, and configured for engaging in the cutout 418. A length of the positioning portion 626 is less than that of the support leg 62, thus the positioning portion 626 can resist a bottom surface of the main body 11 when the main body 11 is supported by the support leg 62 (as shown in FIGS. 4 and 5). The washer 64 is cylindrical in shape. A first circular recess (not shown) and a second circular recess 642 are defined in opposite surfaces of the washer 64 correspondingly. The first recess is configured to receiving an end of the shaft portion 622. A center of the washer 64 also defines a through hole 643. The fastening member 66 is a bolt in this embodiment, which includes a threaded portion 661 and a cap 662 extended from an end of the threaded portion 661. The second recess 642 is configured for receiving the cap 662.

Referring to FIGS. 2 through 5, in a process of assembling the supporting mechanisms 60 to the housing 41, the shaft portion 622 of one support leg 62 is inserted into the pivotal hole 416 of one corresponding first side plates 412 from outside of the housing 41. The washer 64 is sleeved on the shaft portion 622. The fastening member 66 protrudes through the washer 64, and screwed into the fixing hole 624 of the shaft portion 622. Therefore, the support leg 62 is rotatably connected to the housing 41. The support leg 62 is rotated about the axis of the shaft portion 622 until the limiting groove 623 of the support leg 62 engages with the limiting protrusion 417. The positioning portion 626 is received in the cutout 418 of the first side plates 412. The other supporting mechanism 60 is assembled to the other first side plates 412 of the housing 41, according to the above-described assembling steps. After the two supporting mechanisms 60 are assembled to the housing 41, they are received in the receiving grooves 414 and the main body 40 is not supported by the support legs 62, and the pressing portion 625 of the support leg 62 is exposed out of a side of the main body 40.

In use, an external force is applied on the pressing portion 625 of the support leg 62, thus driving the support leg 62 to rotate relative to the shaft portion 622 until the positioning portion 626 resisting the housing 41. Then, the main body 40 is supported by the support leg 62, thereby being slanted to a tabletop of a table. That is, the keyboard 42 is slanted relative to the tabletop of the table.

Because the notebook computer 30 tilted away from the tabletop of the table via the help of the supporting mechanisms 60, the keyboard 42 of the main body 40 is in a convenient position for a user to operate. Furthermore, heat generated from the components can be dispersed more efficiently from a bottom of the main body 40. The electronic components are sealed between the housing 41 and keyboard 42, in order to isolate the electronic components from the user. In addition, the pressing portion 625 is exposed out of the main body 40, so the user just need to push the pressing portion 625, thus driving the support leg 62 to rotate.

It should be understood that, the supporting mechanisms 60 can be used for other electronic devices, such as a portable digital assistant or a portable digital video.

Figure 6:
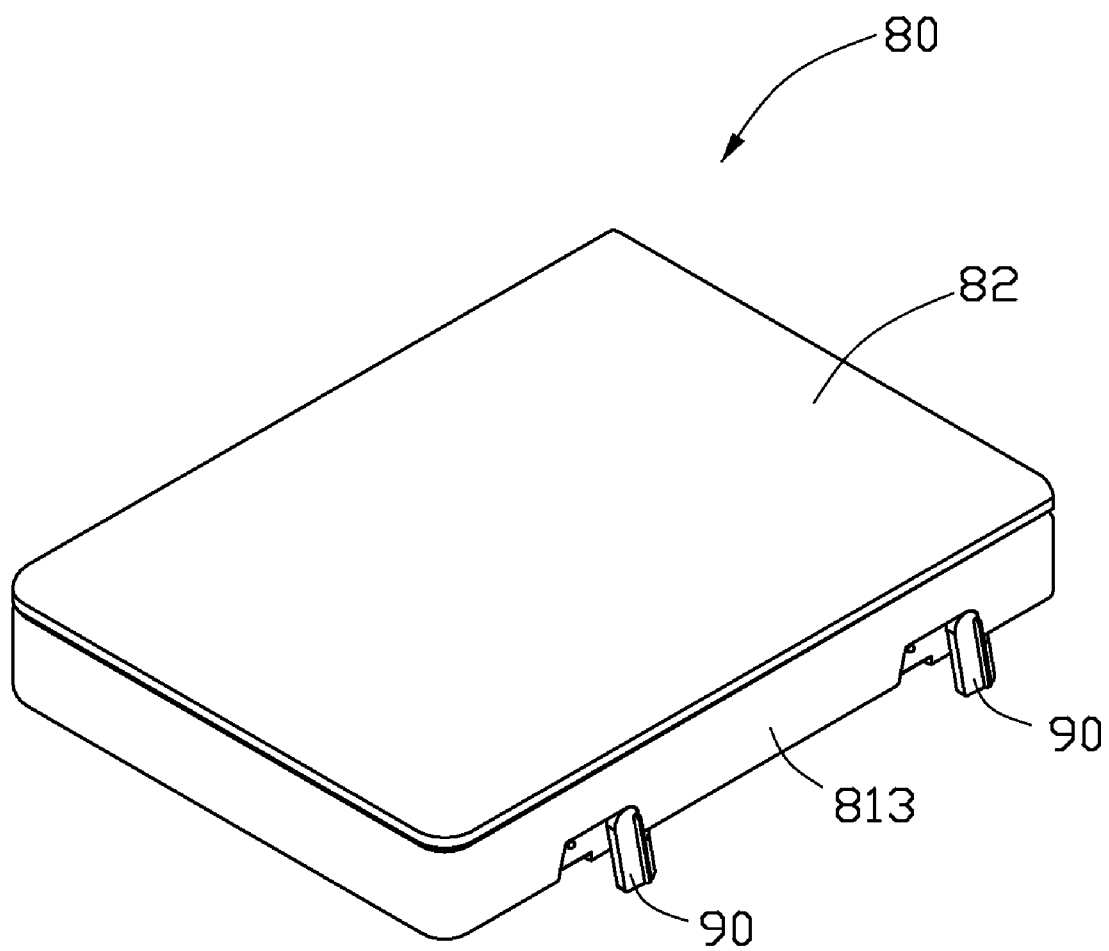
FIG. 6 is an isometric view of a notebook computer in accordance with a second embodiment of the present application.
Figure 7:
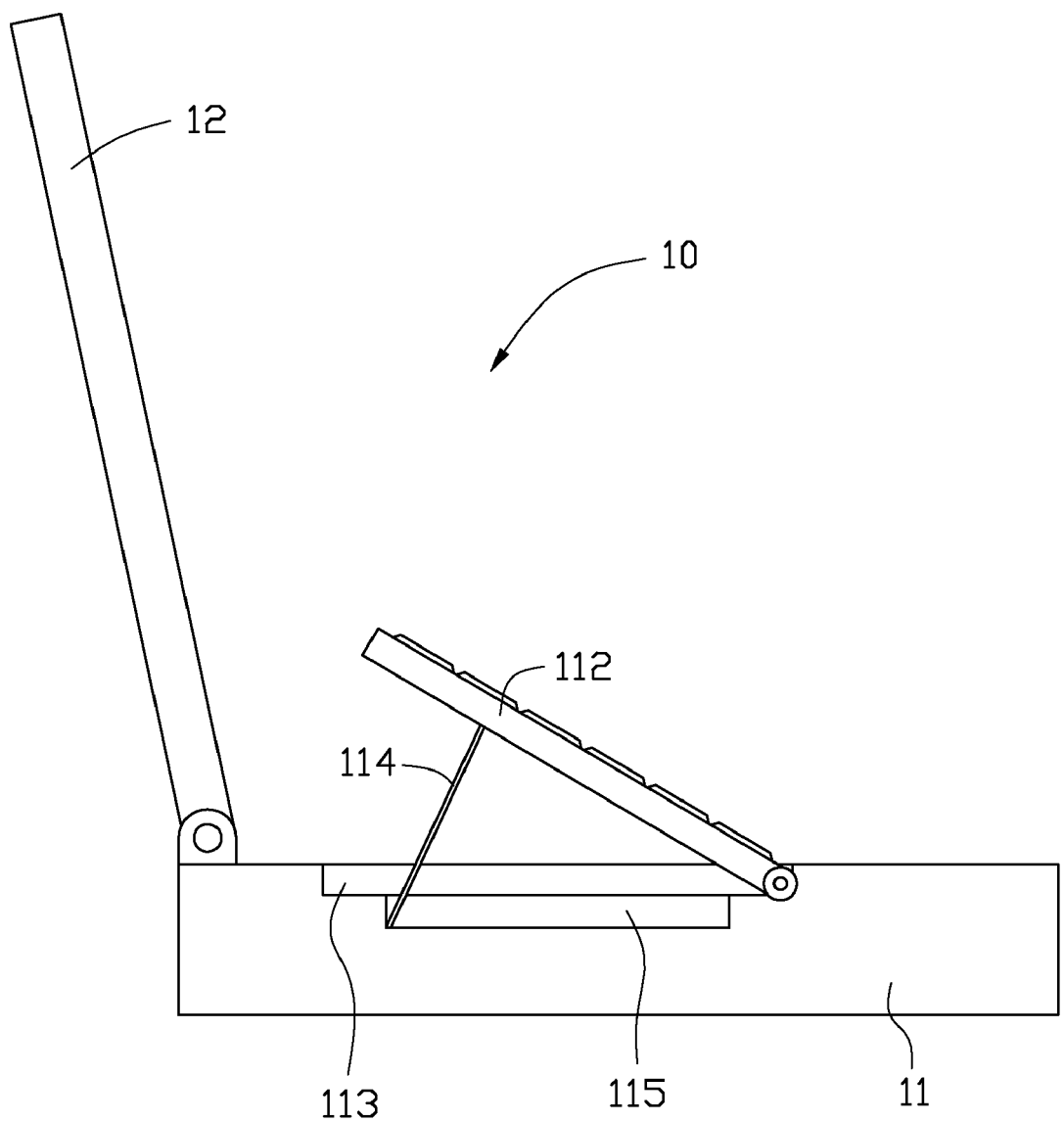
FIG. 7 is a side view of a conventional notebook computer.

Referring to FIG. 6, a notebook computer 80 in accordance with a second embodiment of the present application is shown. The notebook computer 80 is similar in principle to the notebook computer 30 of the first embodiment, however two supporting mechanisms 90 are respectively assembled on opposite ends of a second side plate 813 connected to a display body 82. The notebook computer 80 can be supported by the supporting mechanisms 90, thus being slanted relative to a tabletop of a table the notebook computer 80 laid on. In an alternative embodiment, the notebook computer 80 may includes a single supporting mechanism. In that case, the supporting mechanism is assembled on the middle of the second side plate 813 connected to the display body 82.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
a main body; and
at least one supporting mechanism having a support leg, the support leg rotatably connected to the main body in order to support the main body, the support leg being substantially a rectangular block having a pressing portion protruding out from a first side surface of the support leg and extending along an edge of the first side surface, and exposed from a side of the main body;
wherein a positioning portion substantially perpendicularly extends from a second side surface opposite the first side surface of the support leg along a direction parallel to the pressing portion, and a length of the positioning portion is less than that of the support leg, the positioning portion contacts a bottom surface of the main body when the main body is supported by the support leg.

2. The electronic device as claimed in claim 1, wherein the main body comprises a housing, the housing comprises a base plate and a plurality of side plates, the side plates are substantially perpendicularly extended from the base plate.

3. The electronic device as claimed in claim 2, wherein a shaft portion is formed at an end of the support leg of each of the at least one supporting mechanism, one corresponding side plate of the housing defines a pivotal hole, the shaft portion is capable of being inserted into the pivotal hole of the side plate so that the support leg rotatably connected to the main body.

4. The electronic device as claimed in claim 3, wherein the shaft portion defines a fixing hole along the axis thereof, each of the at least one supporting mechanism further comprises a fastening member, the fastening member is engaged in the fixing hole of the shaft portion.

5. The electronic device as claimed in claim 4, wherein each of the at least one supporting mechanism further comprises a washer, the washer is disposed between the shaft portion and the fixing member.

6. The electronic device as claimed in claim 1, wherein the support leg of each of the at least one supporting mechanism defines a limiting groove thereof, a corresponding limiting protrusion is formed on the main body, the limiting protrusion is configured for engaging with the limiting groove of the support leg.

7. The electronic device as claimed in claim 1, wherein the main body defines a cutout, the positioning portion is configured for engaging in the cutout of the main body.

8. The electronic device as claimed in claim 1, wherein the at least one supporting mechanism is two supporting mechanisms, the supporting mechanisms are disposed on opposite sides of the main body correspondingly.

9. The electronic device as claimed in claim 1, wherein the at least one supporting mechanism is disposed on one side of the main body.

10. The electronic device as claimed in claim 1, wherein the pressing portion is a bar.

11. The electronic device as claimed in claim 1 being a notebook computer.

12. The electronic device as claimed in claim 11, further comprising a keyboard, the keyboard being disposed on the top of the housing.

13. An electronic device, comprising:
a main body;
a display body rotatably connected to the main body; and
at least one supporting mechanism having a support leg, the support leg rotatably connected to the main body in order to support the main body, the support leg being substantially a rectangular block having a pressing portion protruding out from a first side surface of the support leg and extending along an edge of the first side surface, and exposed from a side of the main body;
wherein a positioning portion substantially perpendicularly extends from a second side surface opposite the first side surface of the support leg along a direction parallel to the pressing portion, and a length of the positioning portion is less than that of the support leg, the positioning portion contacts a bottom surface of the main body when the main body is supported by the support leg.

14. The electronic device as claimed in claim 13, wherein the main body comprises a housing, the housing comprises a base plate and a plurality of side plates, the side plates are substantially perpendicularly extended from the base plate.

15. The electronic device as claimed in claim 14, wherein a shaft portion is formed at an end of the support leg of each of the at least one supporting mechanism, one corresponding side plate of the housing defines a pivotal hole, the shaft portion is inserted into the pivotal hole of the side plate.

16. The electronic device as claimed in claim 13, wherein the main body defines a cutout thereof, the positioning portion is configured for engaging in the cutout of the main body.

17. The electronic device as claimed in claim 13, wherein the support leg of each of the at least one supporting mechanism defines a limiting groove thereof, a limiting protrusion is formed on the main body, the limiting protrusion is configured for engaging with the limiting groove of the support leg.

18. The electronic device as claimed in claim 14, further comprising at least one pad formed at the base plate.

* * * * *